(12) United States Patent
Veerasamy

(10) Patent No.: US 8,277,946 B2
(45) Date of Patent: *Oct. 2, 2012

(54) HEAT TREATABLE COATED ARTICLE WITH DIAMOND-LIKE CARBON (DLC) AND/OR ZIRCONIUM IN COATING

(75) Inventor: Vijayen S. Veerasamy, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/801,848

(22) Filed: Jun. 29, 2010

(65) Prior Publication Data

US 2010/0273002 A1    Oct. 28, 2010

Related U.S. Application Data

(60) Continuation of application No. 12/320,664, filed on Jan. 30, 2009, now Pat. No. 7,767,306, which is a division of application No. 10/700,359, filed on Nov. 4, 2003, now Pat. No. 7,501,148.

(51) Int. Cl.
    *B32B 17/06* (2006.01)
(52) U.S. Cl. .......... 428/432; 428/408; 428/702
(58) Field of Classification Search .......... 428/408, 428/426, 427, 428, 432, 689, 698, 702; 427/248.1, 427/376.1, 372.2

See application file for complete search history.

(56) References Cited

U.S. PATENT DOCUMENTS

| | | | |
|---|---|---|---|
| 4,734,802 A | 3/1988 | Higuchi et al. | |
| 5,135,808 A * | 8/1992 | Kimock et al. | 428/336 |
| 5,190,807 A | 3/1993 | Kimock et al. | |
| 5,242,560 A | 9/1993 | Lingle et al. | |
| 5,508,092 A | 4/1996 | Kimock et al. | |
| 5,527,596 A | 6/1996 | Kimock et al. | |
| 5,635,245 A | 6/1997 | Kimock et al. | |
| 5,679,413 A | 10/1997 | Petrmichl et al. | |
| 5,748,389 A | 5/1998 | Gering et al. | |
| 6,261,693 B1 | 7/2001 | Veerasamy | |
| 6,303,226 B2 | 10/2001 | Veerasamy | |
| 6,336,984 B1 * | 1/2002 | Aggas | 156/109 |
| 6,338,901 B1 | 1/2002 | Veerasamy | |
| 6,395,333 B2 | 5/2002 | Veerasamy | |
| 6,416,816 B2 | 7/2002 | Veerasamy et al. | |

(Continued)

FOREIGN PATENT DOCUMENTS

EP    1 380 553    1/2004

(Continued)

OTHER PUBLICATIONS

U.S. Appl. No. 12/320,664, filed Jan. 30, 2009; Veerasamy.

(Continued)

*Primary Examiner* — Jennifer McNeil
*Assistant Examiner* — Lauren Robinson
(74) *Attorney, Agent, or Firm* — Nixon & Vanderhye P.C.

(57) ABSTRACT

In certain example embodiments, a coated article includes respective layers including hydrogenated diamond-like carbon (DLC) and zirconium nitride before heat treatment (HT). During HT, the hydrogenated DLC acts as a fuel which upon combustion with oxygen produces carbon dioxide and/or water. The high temperature developed during this combustion heats the zirconium nitride to a temperature(s) well above the heat treating temperature, thereby causing the zirconium nitride to be transformed into a new post-HT layer including zirconium oxide that is very scratch resistant and durable.

7 Claims, 4 Drawing Sheets

U.S. PATENT DOCUMENTS

| | | |
|---|---|---|
| 6,447,891 B1 | 9/2002 | Veerasamy et al. |
| 6,475,573 B1 | 11/2002 | Veerasamy et al. |
| 6,495,251 B1 | 12/2002 | Arbab et al. |
| 6,682,773 B2 | 1/2004 | Medwick et al. |
| 6,740,211 B2 | 5/2004 | Thomsen et al. |
| 6,764,579 B2 | 7/2004 | Veerasamy et al. |
| 6,770,321 B2 | 8/2004 | Hukari et al. |
| 6,777,030 B2 | 8/2004 | Veerasamy et al. |
| 6,783,253 B2 | 8/2004 | Thomsen et al. |
| 6,793,979 B2 | 9/2004 | Veerasamy |
| 6,849,328 B1 | 2/2005 | Marietti et al. |
| 6,902,813 B2 | 6/2005 | O'Shaughnessy et al. |
| 6,921,579 B2 | 7/2005 | O'Shaughnessy et al. |
| 7,150,849 B2 | 12/2006 | Veerasamy |
| 7,449,218 B2 | 11/2008 | Veerasamy |
| 7,501,148 B2 | 3/2009 | Veerasamy |
| 7,507,442 B2 | 3/2009 | Veerasamy |
| 7,537,801 B2 | 5/2009 | Veerasamy et al. |
| 7,718,267 B2 * | 5/2010 | Veerasamy ............ 428/432 |
| 7,767,306 B2 * | 8/2010 | Veerasamy ............ 428/432 |
| 2002/0192473 A1 | 12/2002 | Gentilhomme et al. |
| 2003/0143401 A1 * | 7/2003 | Hukari et al. ............ 428/408 |
| 2003/0155065 A1 | 8/2003 | Thomsen et al. |
| 2003/0170464 A1 | 9/2003 | Veerasamy |
| 2007/0042186 A1 | 2/2007 | Veerasamy |
| 2007/0042187 A1 | 2/2007 | Veerasamy |

FOREIGN PATENT DOCUMENTS

| | | |
|---|---|---|
| FR | 2 744 177 | 8/1997 |
| WO | WO 03/068502 | 8/2003 |
| WO | WO 2004/007387 | 1/2004 |

OTHER PUBLICATIONS

International Search Report dated Jan. 21, 2005.
International Search Report dated Apr. 6, 2006.

* cited by examiner

HEAT TREATABLE COATED ARTICLE WITH DIAMOND-LIKE CARBON (DLC) AND/OR ZIRCONIUM IN COATING

This application is a continuation of application Ser. No. 12/320,664, filed Jan. 30, 2009 (now U.S. Pat. No. 7,767, 306), which is a divisional of Ser. No. 10/700,359, filed Nov. 4, 2003 (now U.S. Pat. No. 7,501,148), the entire disclosures of which are all hereby incorporated herein by reference in this application.

This invention relates to a method of making a coated article to be used in a window unit or any other suitable application such as furniture glass or picture frame glass. For example, certain embodiments of this invention relate to a method of making a window unit (e.g., vehicle window such as vehicle windshield, backlite, sunroof, or sidelite, or IG window unit, or shower door) including a step of heat treating a glass substrate coated with at least a layer comprising diamond-like carbon (DLC). In certain example embodiments, the DLC may be used to generate energy during heat treatment (HT) for transforming at least another layer in the coating so as to form a new post-HT layer(s) which was not present before the heat treatment. Certain other example embodiments of this invention relate to such a coated article, heat treated or not, which may be used in window applications, or any other suitable application.

BACKGROUND OF THE INVENTION

Vehicle windows (e.g., windshields, backlites, sunroofs, and sidelites) are known in the art. For purposes of example, vehicle windshields typically include a pair of bent glass substrates laminated together via a polymer interlayer such as polyvinyl butyral (PVB). It is known that one of the two glass substrates may have a coating (e.g., low-E coating) thereon for solar control purposes such as reflecting IR and/or UV radiation, so that the vehicle interior can be more comfortable in certain weather conditions. Conventional vehicle windshields are made as follows. First and second flat glass substrates are provided, one of them optionally having a low-E coating sputtered thereon. The pair of glass substrates are washed and booked together (i.e., stacked on one another), and then while booked are heat bent together into the desired windshield shape at a high temperature(s) (e.g., 8 minutes at about 600-625 degrees C.). The two bent glass substrates are then laminated together via the polymer interlayer to form the vehicle windshield.

Insulating glass (IG) window units are also known in the art. Conventional IG window units include at least first and second glass substrates (one of which may have a solar control coating on an interior surface thereof) that are coupled to one another via at least one seal(s) or spacer(s). The resulting space or gap between the glass substrates may or may not be filled with gas and/or evacuated to a low pressure in different instances. However, many IG units are required to be tempered. Thermal tempering of the glass substrates for such IG units typically requires heating the glass substrates to temperature(s) of at least about 600 degrees C. for a sufficient period of time to enable thermal tempering.

Other types of coated articles also require heat treatment (HT) (e.g., tempering, heat bending, and/or heat strengthening) in certain applications. For example and without limitation, glass shower doors, glass table tops, and the like require HT in certain instances.

Diamond-like carbon (DLC) is sometimes known for its scratch resistant properties. For example, different types of DLC are discussed in the following U.S. Pat. Nos. 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and 5,470,661, all of which are hereby incorporated herein by reference.

It would sometimes be desirable to provide a window unit or other glass article with a protective coating including DLC in order to protect it from scratches and the like. Unfortunately, DLC tends to oxidize and burn off at temperatures of from approximately 380 to 400 degrees C., as the heat treatment is typically conducted in an atmosphere including oxygen. Thus, it will be appreciated that DLC as a protective overcoat cannot withstand heat treatments (HT) at the extremely high temperatures described above which are often required in the manufacture of vehicle windows, IG window units, glass table tops, and/or the like. Accordingly, DLC cannot be used alone as a coating to be heat treated, because it will oxidize during the heat treatment and substantially disappear as a result of the same (i.e., it will burn off).

Certain other types of scratch resistant materials also are not capable of withstanding heat treatment sufficient for tempering, heat strengthening and/or bending of an underlying glass substrate.

Accordingly, those skilled in the art will appreciate that a need in the art exists for a method of making a scratch resistant coated article that is capable of being heat treated (HT) so that after heat treatment the coated article is still scratch resistant. A need for corresponding coated articles, both heat treated and pre-HT, also exists.

BRIEF SUMMARY OF EXAMPLES OF INVENTION

In certain example embodiments of this invention, there is provided a method of making a coated article (e.g., window unit such as for a vehicle, building, or the like) that is capable of being heat treated so that after being heat treated (HT) the coated article is scratch resistant to an extent more than uncoated glass.

In certain example embodiments, a coated article includes respective layers comprising hydrogenated diamond-like carbon (DLC) and zirconium nitride before heat treatment (HT). During HT, the hydrogenated DLC acts as a fuel which upon combustion with oxygen produces carbon dioxide and/or water. This exothermic reaction, caused by combustion of hydrogenated carbon of the DLC, causes spontaneous propagation of a combustion wave through the initial reactants. The high temperature developed during this combustion heats the layer comprising zirconium nitride to a temperature(s) well above the heat treating temperature, thereby causing the layer comprising zirconium nitride to be transformed into a new post-HT layer comprising zirconium oxide. The new post-HT layer comprising zirconium oxide may also include nitrogen in certain example embodiments of this invention. The new post-HT layer comprising zirconium oxide is surprisingly scratch resistant. Thus, it can be seen that a technique has been provided which allows for a heat treatable scratch resistant product; and the coated article may also have good transmission properties. In certain example embodiments, the scratch resistance of the post-HT coated article may even be better than that of non-HT DLC.

In certain example embodiments, there is provided a method of making a heat treated coated article, the method comprising: providing a coating supported by a glass substrate, the coating comprising a layer comprising zirconium nitride and a layer comprising hydrogenated diamond-like carbon (DLC) provided over at least the layer comprising zirconium nitride; heat treating the glass substrate and the coating in a manner sufficient for thermal tempering, heat strengthening and/or heat bending the glass substrate; and wherein during said heat treating the layer comprising hydrogenated DLC is subject to combustion or burns off so as to generate heat sufficient to cause the layer comprising zirconium nitride to transform into a heat treated layer comprising zirconium oxide in the heat treated coated article.

In other example embodiments of this invention, there is provided a method of making a heat treated coated article, the method comprising: providing a coating supported by a glass substrate, the coating comprising a layer comprising a metal nitride and a layer comprising diamond-like carbon (DLC) provided over at least the layer comprising the metal nitride; heat treating the glass substrate and the coating; and wherein, during the heat treating, the layer comprising DLC is subject to combustion or burns off so as to cause the layer comprising the metal nitride to transform into a heat treated layer comprising an oxide of the metal in the heat treated coated article. The metal may be Zr, or any other suitable metal or metal alloy.

In still further example embodiments of this invention, there is provided a heat treated coated article including a coating supported by a glass substrate, the coating comprising: an outermost layer comprising nanocrystalline zirconium oxide comprising cubic lattice structure; and wherein the layer comprising zirconium oxide further comprises from 0.25 to 20% carbon.

In other example embodiments of this invention, there is provided a coated article including a coating supported by a glass substrate, the coating comprising from the glass substrate outwardly: a layer comprising zirconium nitride; and a layer comprising hydrogenated diamond-like carbon (DLC). Other layers may also be provided in any suitable location. Such a coated article, in certain example embodiments, may be adapted to be heat treated in order to cause the nitride to transform at least partially into an oxide.

In other example embodiments of this invention, there is provided a method of making a coated article, the method comprising: providing a coating supported by a substrate, the coating comprising a layer comprising diamond-like carbon (DLC) and a layer to be phase-transformed during heat treatment; heating the layer comprising DLC and the layer to be phase-transformed in order to cause combustion of the layer comprising DLC thereby causing the layer comprising DLC to generate heat upon combustion thereof; and using the heat generated by combustion of the layer comprising DLC to help phase-transform the layer to be phase-transformed so that a new phase-transformed layer is formed following the heating.

DETAILED DESCRIPTION OF EXAMPLE EMBODIMENTS OF THE INVENTION

Figure 1:
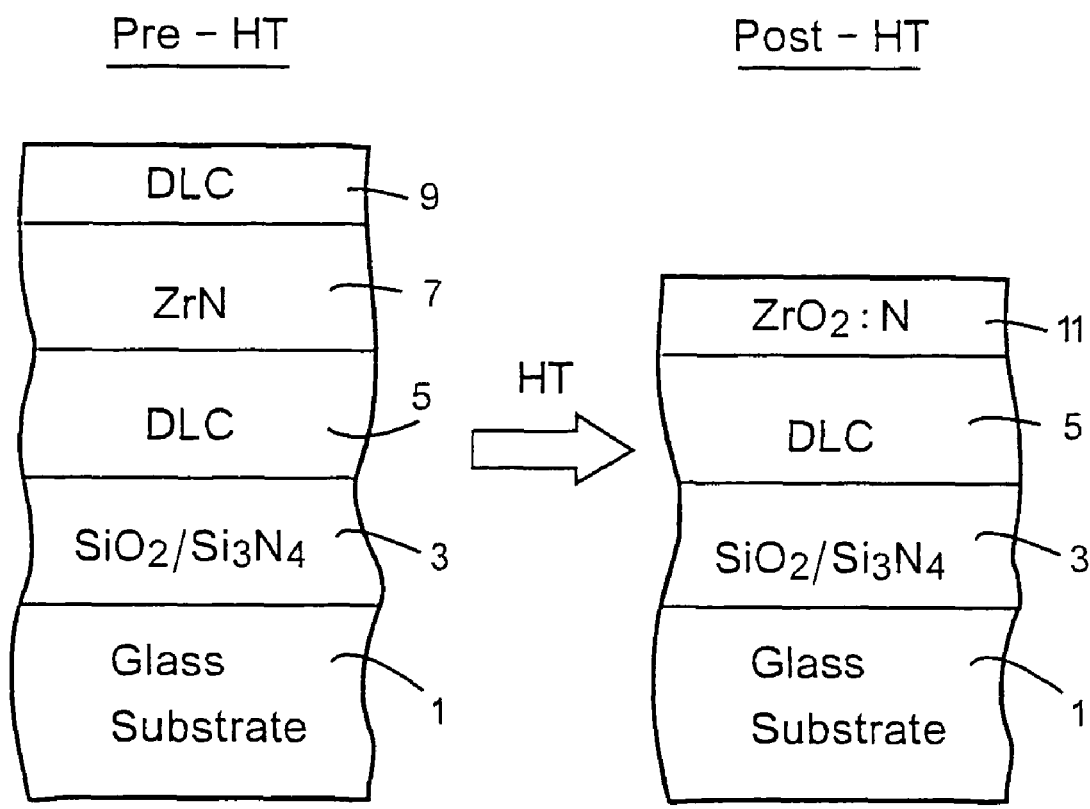
FIG. 1 is a schematic diagram illustrating coated articles according to an embodiment of this invention before and after heat treatment.

Referring now more particularly to the accompanying drawings in which like reference numerals indicate like parts or layers throughout the several views.

Certain example embodiments of this invention relate to methods of making coated articles that may use heat treatment (HT), wherein the coated article includes a coating (one or more layers) including diamond-like carbon (DLC) and/or zirconium. In certain instances, the HT may involve heating a supporting glass substrate, with the DLC and/or zirconium inclusive layer(s) thereon, to temperature(s) of from 550 to 800 degrees C., more preferably from 580 to 800 degrees C. (which is well above the burn-off temperature of DLC). In particular, certain example embodiments of this invention relate to a technique for allowing the post-HT coated article to be more scratch resistant than uncoated glass.

In certain example embodiments, the coated article as originally formed (i.e., prior to HT, or pre-HT) includes respective alternating layers comprising hydrogenated diamond-like carbon (DLC) and zirconium nitride. During HT (e.g., using temperature(s) of from 550 to 800 degrees C., more preferably from 580 to 800 degrees C.), the hydrogenated DLC acts as a fuel which upon combustion with oxygen from the atmosphere produces carbon dioxide and water. This exothermic reaction, caused by combustion of the hydrogenated carbon of the DLC, causes spontaneous propagation of a combustion wave through the initial reactants. The high temperature developed during this DLC combustion heats the layer(s) comprising zirconium nitride to a temperature(s) well above the heat treating temperature used. For example, the combustion of the DLC may heat part of all of the layer(s) comprising zirconium nitride to a temperature of at least about 1200 degrees C., more preferably at least about 1500 degrees C., and most preferably at least about 2,000 degrees C.

Because the layer(s) comprising zirconium nitride is heated to such a high temperature due to the DLC combustion during HT, at least the layer(s) comprising zirconium nitride is transformed due to the high temperature(s) into a new post-HT layer(s) comprising zirconium oxide. The new post-HT layer(s) comprising zirconium oxide may also include nitrogen in certain example embodiments of this invention (e.g., $ZrO:N$; $ZrO_2:N$, or any other suitable stoichiometry). The new post-HT layer(s) comprising zirconium oxide (optionally with nitrogen) is surprisingly scratch resistant. Thus, it can be seen that a technique has been provided which allows for a heat treatable scratch resistant product to be made; and the coated article may also have good transmission properties. In certain example embodiments, the scratch resistance of the post-HT coated article may even be better than that of non-HT DLC.

In certain example embodiments of this invention, the post-HT layer(s) comprising zirconium oxide includes a nanocrystalline cubic lattice structure. The entire layer(s) may be of a nanocrystalline cubic lattice structure type, or alternatively only part of the layer(s) may include nanocrystalline cubic lattice structure. Zirconium nitride typically does not grow in cubic phase unless at a temperature of at least about 2,000 degrees C. The ZrN pre-HT is typically not in cubic lattice form. Since the HT is only at a temperature of no greater than about 900 degrees C. (more preferably no greater than about 800 degrees C.), one would expect that the pre-HT non-cubic zirconium nitride would not grow in cubic phase during HT. However, it has surprisingly been found that the combustion generated by the DLC during HT causes at least part of the layer comprising zirconium nitride to be heated sufficiently to cause it to transform into a post-HT layer(s) comprising zirconium oxide which includes a nanocrystalline cubic lattice structure (with or without nitrogen) which is very scratch resistant.

Thus, it can be seen that in certain example embodiments of this invention the pre-HT zirconium nitride inclusive layer is transformed during HT into a new post-HT layer comprising zirconium oxide including a nanocrystalline cubic lattice structure, even though the temperatures used by the furnace during HT are well less than those required for typically allowing the cubic growth. It is the combustion of the DLC during HT which causes enough energy/heat to be generated at the zirconium inclusive layer in order to allow it to change phase and grow in at least a cubic manner so as to finally comprise a nanocrystalline cubic lattice structure following HT.

As a result of the HT, the amount of oxygen in the post-HT zirconium inclusive layer(s) is much higher than the amount of oxygen in the pre-HT zirconium inclusive layer(s). For example, in certain example embodiments of this invention, the post-HT layer(s) comprising zirconium oxide includes at least 5 times as much oxygen as the pre-HT layer(s) comprising zirconium nitride, more preferably at least 10 times as much, and most preferably at least 20 times as much oxygen as the pre-HT layer(s). In certain example embodiments of this invention, the pre-HT layer(s) comprising zirconium nitride includes from about 0-10% oxygen, more preferably from about 0-5% oxygen, and most preferably from about 0-2% (atomic %) oxygen. Meanwhile, in certain example embodiments of this invention, following HT and phase transformation due to DLC combustion, the post-HT layer(s) comprising zirconium oxide includes much more oxygen as will be explained below.

FIG. 1 is a schematic diagram illustrating how a coated article can be made according to an example embodiment of this invention. Initially, a coated article is formed using a glass substrate 1. The coated article includes, supported by glass substrate 1, at least one optional dielectric layer 3 of or including silicon nitride, silicon oxynitride, silicon oxide, or the like; a first layer of or including DLC 5, a first layer of or including zirconium nitride 7 (e.g., ZrN, or any other suitable stoichiometry), and a top layer of or including DLC 9. Glass substrate 1 is typically of or includes soda-lime-silica glass, although other types of glass may be used in certain instances.

Dielectric layer(s) 3 is provided in order to prevent sodium diffusion into the DLC during HT (i.e., a diffusion barrier). This layer(s) 3 also permits thermal mismatching to occur without problems between the DLC and the glass substrate so as to more easily permit heat bending and the like. Unexpectedly, it has been found that the use of silicon oxide as a barrier layer 3 (compared to silicon nitride) often leads to improved optical results of the final product after heat treatment such as higher visible transmission. Any of the aforesaid barrier layer 3 materials may be doped (e.g., 0.5 to 15%) with Al, stainless steel, or any other metal(s) in certain embodiments of this invention. Barrier layer(s) 3 is formed on the glass substrate 1 via sputtering, or via any other suitable technique.

The layers 5 and 9 comprising DLC may be of any suitable type of DLC, including but not limited to any of the DLC types described in any of U.S. Pat. Nos. 6,592,993; 6,592,992; 6,531,182; 6,461,731; 6,447,891; 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and/or 5,470,661, all of which are hereby incorporated herein by reference.

For purposes of example only, DLC inclusive layer(s) 5 and/or 9 may each be from about 5 to 1,000 angstroms (Å) thick in certain example embodiments of this invention, more preferably from 10-300 Å thick, and most preferably from 45 to 65 Å thick. In certain example embodiments of this invention, DLC layer(s) 5 and/or 9 may have an average hardness of at least about 10 GPa, more preferably at least about 20 GPa, and most preferably from about 20-90 GPa. Such hardness renders layers 5 and 9 resistant to scratching, certain solvents, and/or the like. Layer(s) 5 and/or 9 may, in certain example embodiments, be of or include a special type of DLC known as highly tetrahedral amorphous carbon (t-aC), and may be hydrogenated (t-aC:H) in certain embodiments. In certain hydrogenated embodiments, the t-aC:H type of DLC may include from 4 to 39% hydrogen, more preferably from 5-30% H, and most preferably from 10-20% H.

This t-aC or t-aC:H type of DLC for layer(s) 5 and/or 9 may include more $sp^3$ carbon-carbon (C—C) bonds than $sp^2$ carbon-carbon (C—C) bonds. In certain example embodiments, at least about 50% of the carbon-carbon bonds in DLC layer(s) 5 and/or 9 may be $sp^3$ type carbon-carbon (C—C) bonds, more preferably at least about 60% of the carbon-carbon bonds in the layer(s) may be $sp^3$ carbon-carbon (C—C) bonds, and most preferably at least about 70% of the carbon-carbon bonds in the layer(s) may be $sp^3$ carbon-carbon (C—C) bonds. In certain example embodiments of this invention, the DLC in layer(s) 5 and/or 9 may have an average density of at least about 2.4 $gm/cm^3$, more preferably at least about 2.7 $gm/cm^3$.

Example linear ion beam sources that may be used to deposit DLC inclusive layers 5 and 9 on substrate 1 include any of those in any of U.S. Pat. Nos. 6,261,693, 6,002,208, 6,335,086, or 6,303,225 (all incorporated herein by reference). When using an ion beam source to deposit layer(s) 5 and/or 9, hydrocarbon feedstock gas(es) (e.g., $C_2H_2$), HMDSO, or any other suitable gas, may be used in the ion beam source in order to cause the source to emit an ion beam toward substrate 1 for forming layer(s) 5 and/or 9. It is noted that the hardness and/or density of layer(s) 5 and/or 9 may be adjusted by varying the ion energy of the depositing apparatus. It is noted that the phrase "on the substrate" as used herein is not limited to being in direct contact with the substrate as other layer(s) may still be provided therebetween.

Zirconium nitride inclusive layer 7 is provided between DLC layers 5 and 9 in certain example embodiments of this invention. In certain example embodiments, zirconium nitride inclusive layer 7 may be located directly between DLC layers 5 and 9 so as to contact each of them; however in other example embodiments other layer(s) (not shown) may be provided between the zirconium nitride inclusive layer 7 and the DLC layer(s) 5 and/or 9. The zirconium nitride inclusive layer 7 may consist essentially of zirconium and nitride, or alternatively may include other materials including but not limited to oxygen, or other dopants such as Al or the like. Zirconium nitride inclusive layer 7 may be formed by sputtering or the like in certain example embodiments of this invention. The pre-HT layer(s) comprising zirconium nitride 7 (and 7' discussed below) may include from about 10-70% Zr, more preferably from about 30-65% Zr, even more preferably from about 40-60% Zr, and most preferably from about 45-55% Zr in terms of atomic %; and from about 20-60% N, more preferably from about 30-50% N in terms of atomic %.

In certain example embodiments of this invention, zirconium nitride inclusive layer 7 (and 7' to be discussed below) may have a density of at least 6 $gm/cm^3$, more preferably at least 7 $gm/cm^3$. Additionally, in certain example embodiments, zirconium nitride layer 7 (and 7') may have an average hardness of at least 650 kgf/mm, more preferably of at least 700 kgf/mm, and/or may have a bond overlap population of at least 0.25 (more preferably at least about 0.30) for strength purposes. In certain example instances, many of the Zr—N bonds in layer 7 (and 7') may be of the covalent type, which are stronger than ionic bonds, for strength purposes. It is also noted that in certain example embodiments of this invention, the ZrN of layer 7 (and 7') may have a melting point of at least 2,500 degrees C., and it may be about 2,980 degrees C. in certain example instances. In certain example embodiments of this invention, the zirconium nitride of layer 7 (and 7') may be represented by $Zr_xN_y$, where the ratio x:y is from 0.8 to 1.2, and is preferably about 1.0 in certain example embodiments.

For purposes of example only, certain example thicknesses for the pre-HT layers shown on the left side of FIG. 1 are set forth below, with the layers being listed in order from the glass substrate outwardly.

Example Coating (FIG. 1)—Layer Thicknesses (Pre-HT)

| Layer | General | More Preferred | Most Preferred |
| --- | --- | --- | --- |
| Dielectric (layer 3) | 50-500 Å | 100-300 Å | 180-220 Å |
| DLC (layer 5) | 10-300 Å | 15-100 Å | 20-45 Å |
| ZrN (layer 7) | 40-500 Å | 50-400 Å | 90-220 Å |
| DLC (layer 9) | 20-300 Å | 30-100 Å | 40-65 Å |

Once the pre-HT coated article shown on the left side of FIG. 1 is formed, it may or may not be subjected to heat treatment sufficient for at least one of heat bending, thermal bending, and/or heat strengthening.

Referring to FIG. 1, when subjected to HT (e.g., in a furnace using temperature(s) of from 550 to 800 degrees C., more preferably from 580 to 800 degrees C.), the upper or outer DLC inclusive layer 9 burns off due to combustion because of the high temperatures used during HT. In particular, at least hydrogenated DLC layer 9 acts as a fuel which upon combustion with oxygen from the atmosphere during HT produces carbon dioxide and water. This exothermic reaction, caused by combustion of hydrogenated carbon from at least DLC layer 9, causes spontaneous propagation of a combustion wave through the initial reactants. The high temperature developed during this combustion heats the layer 7 comprising zirconium nitride to a temperature(s) well above the heat treating temperature used by the furnace. For example, the combustion of the DLC 9 may heat part of all of the layer 7 comprising zirconium nitride to a temperature of at least about 1200 degrees C., more preferably at least about 1500 degrees C., and most preferably at least about 2,000 degrees C.

Because the layer comprising zirconium nitride 7 is heated to such a high temperature due to the DLC combustion during HT, the layer comprising zirconium nitride 7 is transformed during the HT into a new post-HT layer comprising zirconium oxide 11. The new post-HT layer comprising zirconium oxide 11 may also include nitrogen (and/or other dopants) in certain example embodiments of this invention (e.g., ZrO:N; $ZrO_2$:N; or any other suitable stoichiometry). The new post-HT layer comprising zirconium oxide 11 (optionally with nitrogen) is surprisingly scratch resistant thereby providing a heat treated scratch resistant coated article. It is noted that the phrase "zirconium oxide" as used herein includes $ZrO_2$ and/or any other stoichiometry where Zr is at least partially oxided. Herein, any description of layer 11 also may apply to layer 11'; and likewise any description of layer 7 may apply to layer 7'.

The post-HT layer comprising zirconium oxide 11 may include from 0-30% nitrogen in certain example embodiments of this invention, more preferably from 0-20% nitrogen, even more preferably from 0-10% nitrogen, and most preferably from about 1-5% nitrogen in certain example embodiments of this invention. The post-HT layer comprising zirconium oxide 11 may include from about 10-70% Zr, more preferably from about 20-60% Zr, even more preferably from about 30-55% Zr, and most preferably from about 30-45% Zr in terms of atomic %. Moreover, the post-HT layer(s) comprising zirconium oxide 11 in certain example embodiments of this invention may include from about 10-85% oxygen, more preferably from about 30-80% oxygen, even more preferably from about 40-70% oxygen, and most preferably from about 50 to 70% oxygen.

In certain example embodiments of this invention, the post-HT layer comprising zirconium oxide 11 includes a nanocrystalline cubic lattice structure (although the pre-HT layer comprising zirconium nitride did not in certain instances). As explained above, zirconium nitride typically does not grow in cubic phase unless at a temperature of at least about 2,000 degrees C. It has surprisingly been found that the combustion generated by the DLC during HT causes at least part of the pre-HT layer comprising zirconium nitride 7 to be heated sufficiently to cause it to grow in the cubic phase and become a post-HT layer 11 comprising a nanocrystalline cubic lattice structure including zirconium oxide (with or without nitrogen) which is very scratch resistant in certain example embodiments of this invention.

It has surprisingly been found that the use of zirconium nitride (e.g., ZrN) in the pre-HT layer 7 is especially beneficial with respect to allowing a post-HT phase-transformed layer 11 including Zr to be formed which is very scratch resistant.

The final HT (or even the non-HT) coated article of FIG. 1 is scratch resistant and may be used in various applications, including but not limited to IG window units, laminated vehicle windshields, other types of vehicle windows, furniture applications, and/or the like.

For purposes of example only, certain example thicknesses for the post-HT coated article shown on the right side of FIG. 1 are set forth below, with the layers being listed in order from the glass substrate outwardly.

Example Coating (FIG. 1)—Layer Thicknesses (Post-HT)

| Layer | General | More Preferred | Most Preferred |
| --- | --- | --- | --- |
| Dielectric (layer 3) | 50-500 Å | 100-300 Å | 180-220 Å |
| DLC (layer 5) | 10-300 Å | 15-100 Å | 20-45 Å |
| ZrO:N (layer 11) | 50-800 Å | 70-600 Å | 100-350 Å |

It can be seen from the above that post-HT Zr inclusive layer 11 is typically thicker than is pre-HT Zr inclusive layer 7. In other words, the thickness of the Zr inclusive layer increases during HT. In certain example embodiments of this invention, the thickness of the Zr inclusive layer (e.g., from layer 7 to layer 11) may increase at least about 5% during or due to HT, more preferably at least about 10%, and most preferably at least about 40%. This increase in thickness is caused by the transformation of layer 7 into layer 11, where oxygen migrates into the post-HT layer 11 (i.e., more oxygen migrates into the post-HT layer 11 than nitrogen leaves in terms of atomic % and/or size).

While the DLC layer 5 is shown as being present in the post-HT coated article in FIG. 1, it need not be present in the post-HT coated article in alternative embodiments of this invention. If the pre-HT DLC layer 5 reaches sufficient temperature and/or is exposed to enough oxygen during HT, it may be subject to combustion thereby causing it to decrease in thickness or even vanish due to HT in certain instances. In such cases, the pre-HT layers 5, 7 and 9 may be effectively transformed during HT into post-HT zirconium oxide inclusive layer 11 (it is similar to the FIG. 5 embodiment in this regard).

In certain example embodiments of this invention, the heat treated layer 11 comprising zirconium oxide includes $Zr_xO_y$, wherein y/x is from about 1.2 to 2.5, more preferably from about 1.4 to 2.1.

Figure 2:
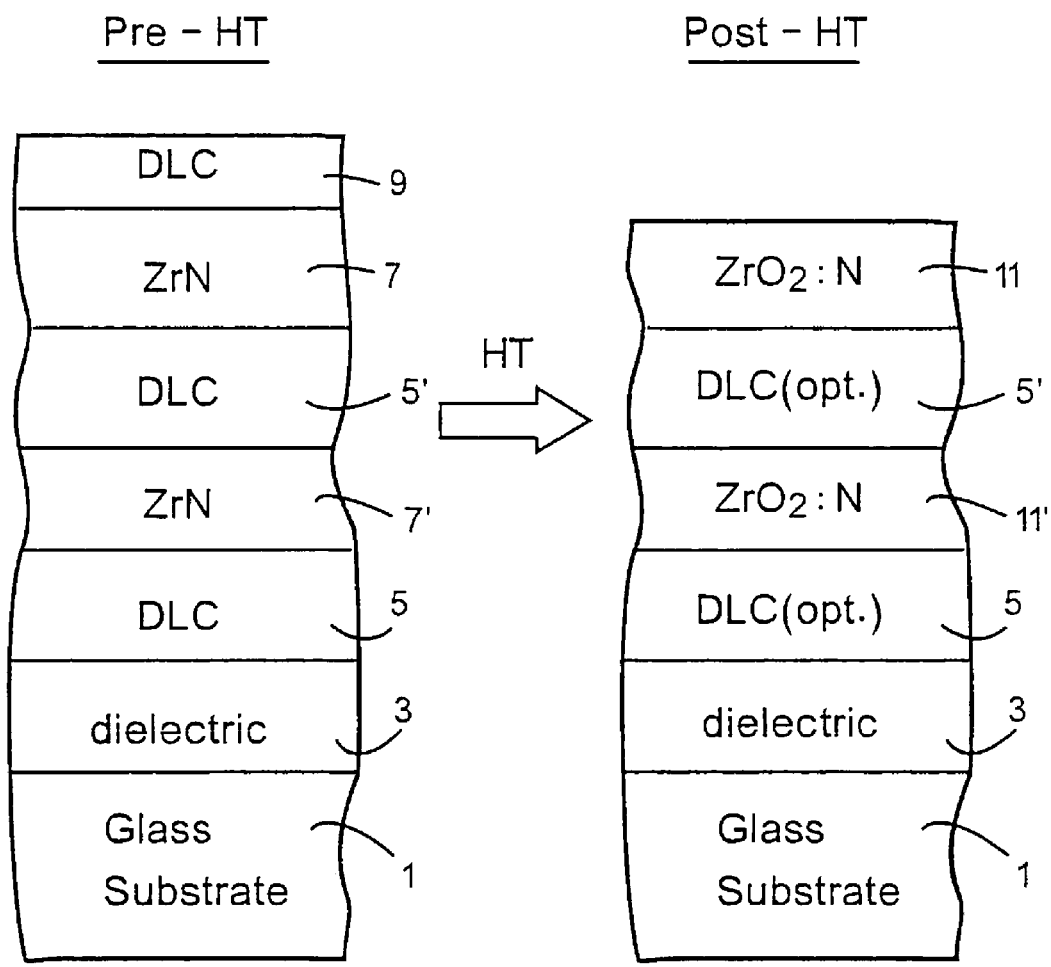
FIG. 2 is a schematic diagram illustrating coated articles according to another embodiment of this invention before and after heat treatment.

FIG. 2 illustrates another example embodiment according to this invention. The FIG. 2 embodiment is similar to the FIG. 1 embodiment, except that additional ZrN inclusive layer(s) 7' and additional DLC inclusive layer(s) 5' are provided pre-HT. In other words, the FIG. 2 embodiment includes plural sets of alternating layers comprising DLC and ZrN pre-HT. Thus, following HT, an additional zirconium oxide inclusive layer(s) 11' and an additional DLC inclusive layer 5' may be provided as shown on the right side of FIG. 2. Layers 5', 7', and 11' are similar to layers 5, 7, and 11, respectively, discussed above, in certain example embodiments of this invention. However, it is possible that one or both of hydrogenated DLC layers 5, 5' may be subject to combustion and substantially disappear or substantially decrease in thickness due to HT in certain example embodiments of this invention when high temperature and/or long heating times are used so that a single ZrO layer remains (e.g., see FIG. 5), although some DLC may remain as shown in FIG. 2. However, as shown in the FIG. 2 embodiment, at least the outer hydrogenated DLC layer 9 typically burns off due to combustion and generates the energy/heat needed to cause one of more of the ZrN layer(s) 7, 7' to transform into ZrO inclusive layer(s) 11, 11' as explained above.

Still referring to the FIG. 2 embodiment, in certain example non-limiting embodiments of this invention, oxygen from the atmosphere diffuses inwardly through the layers(s) in order to help the pre-HT zirconium nitride layers 7 and 7' to transform, aided by the heat generated by the combustion discussed above, into the post-HT layers 11 and 11' comprising zirconium oxide. However, in other example embodiments of this invention, pre-HT zirconium nitride layer 7' need not phase transform during HT; in such embodiments, the post-HT layer 11' would be similar to the pre-HT layer 7' and consist essentially of zirconium nitride. In still other embodiments of this invention, layer 11' may be partially transformed and thus include a mixture of zirconium nitride and zirconium oxide.

Figure 3:
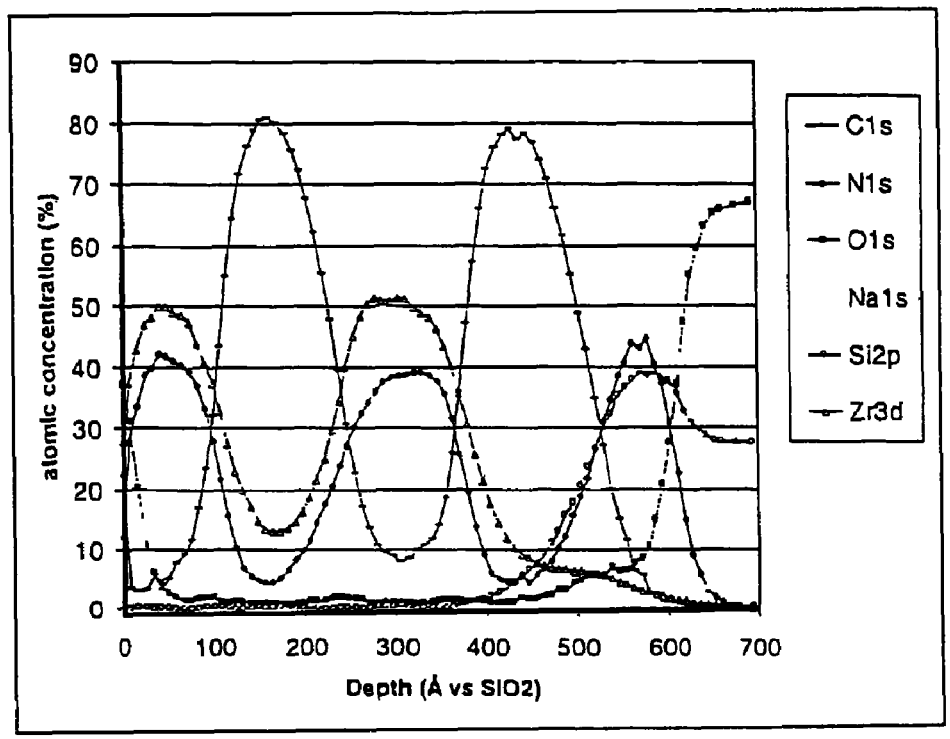
FIG. 3 is an XPS graph illustrating chemical elements in a pre-HT coated article according to an example of the instant invention.
Figure 4:
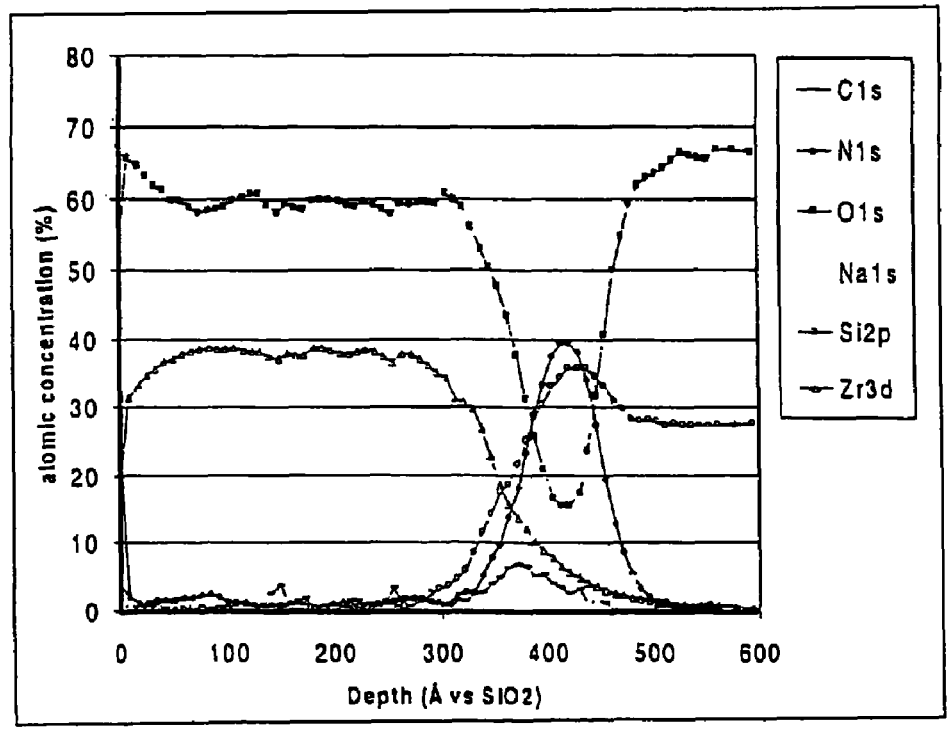
FIG. 4 is an XPS graph illustrating chemical elements in the coated article of FIG. 3, after the coated article of FIG. 3 has been subjected to HT.
Figure 5:
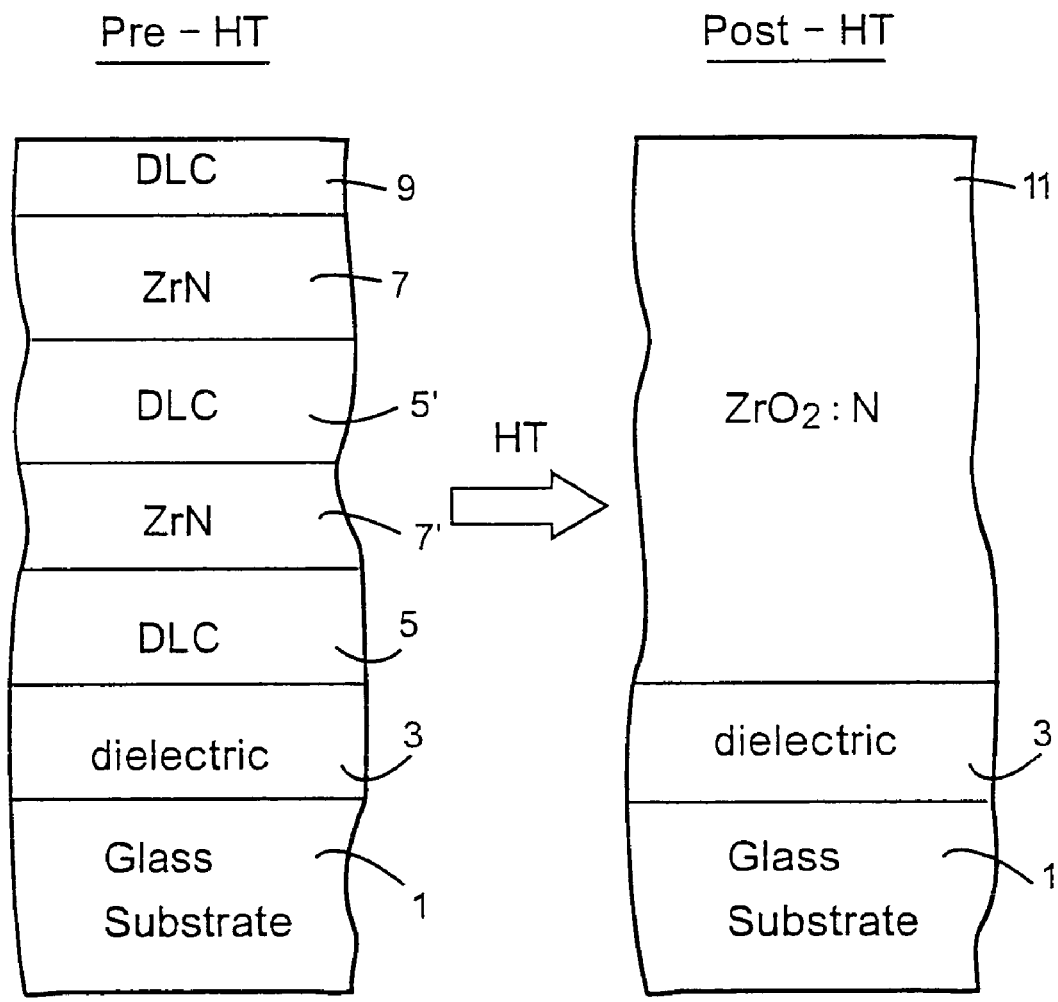
FIG. 5 is a schematic diagram illustrating coated articles according to an embodiment of this invention before and after heat treatment.

FIGS. 3-5 illustrate another example embodiment of this invention. The pre-HT coated article of this embodiment is the same as that of the FIG. 2 embodiment described above. FIG. 3 is an XPS graph illustrating the chemical make-up of an example coated article pre-HT according to the FIG. 5 embodiment. However, in contrast to the FIG. 2 illustrated embodiment, in the FIG. 5 embodiment during HT all DLC layers are subject to combustion and essentially disappear. This in turn creates a significant amount of heat and coupled with oxygen diffusing into the coating from the surrounding atmosphere causes each of the pre-HT zirconium nitride layers to phase transform during HT so as to form at least one post-HT layer comprising zirconium oxide (which may or may not be doped with N) 11. In the FIG. 5 embodiment, the pre-HT layers 5, 7', 5', 7 and 9 merge into or ultimately result in one rather thick post-HT layer comprising zirconium oxide 11. FIG. 4 is an XPS graph illustrating the chemical make-up of an example post-HT coated article according to the FIG. 5 embodiment.

In the FIG. 3-5 embodiment, it can be seen in FIG. 4 that residual carbon remains in the zirconium oxide layer 11 following HT due to the presence of the pre-HT DLC layer(s). In certain example embodiments of this invention, the zirconium oxide layer 11 includes from 0.25 to 20% C, more preferably from 0.25 to 10% C, and most preferably from 0.25 to 5% C.

Each of the aforesaid embodiments provides for a heat treatable coated article that is very scratch resistant following HT. For example, post-HT coated articles according to certain embodiments of this invention may have a critical scratch load using an alumina sphere of at least about 15 lbs., more preferably at least 18 lbs., even more preferably at least 20 lbs., still most preferably at least 22.5 lbs., and most preferably at least 30 lbs. Additionally, coated articles according to certain example embodiments of this invention are UV stable, and do not significantly degrade upon UV exposure. In certain example embodiments, coated articles herein may have a post-HT contact angle θ with a sessile drop of water of from about 25 to 60 degrees; and sometimes the contact angle is less than 35 degrees.

Moreover, in certain example embodiments, good optics are provided in that no significant yellow tint is present post-HT even though yellowish DLC may have been present at least in the pre-HT version of the product. The resulting heat treated coated article is surprisingly transmissive to visible light. For example, the heat treated coated article may have a visible transmission of at least 50%, more preferably of at least 60%, even more preferably of at least 70%, more preferably at least 75%, and sometimes at least 80% according to certain example embodiments of this invention. According to certain example embodiments of this invention, post-HT coated articles have a transmissive a* value of from −5 to +2, more preferably from −4 to 0, and most preferably from −3.5 to −1; and a transmissive b* value of from −8 to +8, more preferably from −3 to +3, and most preferably from −2 to +2. In other words, heat treated coated articles according to certain example embodiments of this invention visually appear very similar to clear uncoated glass, even though the numerous layers for durability purposes are provided thereon.

Another unique aspect of certain example embodiments of this invention is the extreme increase in visible transmission caused by heat treatment. In certain example embodiments, visible transmission increases by at least about 20 visible transmission % due to HT, more preferably at least 30%, and most preferably at least 40%. For example, in certain examples of this invention that have been made, the pre-HT visible transmission has been about 36-37%. Following heat treatment for about 400 seconds at about 640 degrees C., the post-HT visible transmission was about 77-81%. In each case, the visible transmission increased by about 40-45% due to HT. For purposes of example and understanding, if a pre-HT coated article had a visible transmission of 36% and following HT the post-HT coated article had a visible transmission of 80%, then the visible transmission increased 44% (i.e., 80%−36%=44%) due to HT. The apparent reason for this significant increase in visible transmission due to HT is the vanishing of at least some DLC due to HT because of the aforesaid combustion thereof. DLC blocks visible transmission to some extent, and its combustion and disappearance during HT allows visible transmission of the resulting HT coated article to significantly increase as shown above. Thus, not only does the DLC combustion act as a fuel which allows transformation of the Zr inclusive layer, but it also allows visible transmission to significantly increase.

Any suitable type of glass substrate 1 may be used in different embodiments of this invention. For example, various types of soda lime silica glass or borosilicate glass may be used for substrate 1. However, in certain example embodiments of this invention, the coating of any of the aforesaid embodiments may be supported by a special type of glass substrate that has a very high visible transmission and a very clear color. In particular, in such certain example embodiments of this invention, the glass substrate 1 may be any of the glasses described in commonly owned U.S. patent application Ser. No. 10/667,975, the disclosure of which is hereby incorporated herein by reference. In certain preferred embodiments, the resulting glass has visible transmission of at least 85%, more preferably at least 88%, and most preferably at least 90% (e.g., at a reference thickness of about 0.219 inches or 5.56 mm). The advantage of using such a glass substrate 1 is that the resulting HT product is caused to have a visual appearance similar to that of uncoated clear glass— even though the coating is provided thereon. In addition to the base glass, examples of the glass batch and/or final glass are set forth below (in terms of weight percentage of the total glass composition, unless otherwise listed as ppm):

Example Colorants and Oxidizer Cerium in Glass Substrate

| Ingredient | General | Preferred | More Preferred | Best |
|---|---|---|---|---|
| total iron ($Fe_2O_3$): | 0.01-0.20% | 0.01-0.15% | 0.02-0.12% | 0.04 to 0.10% |
| cobalt oxide: | 0.1 to 15 ppm | 0.3 to 10 ppm | 0.5 to 5 ppm | 0.5 to 3 ppm |
| cerium oxide: | 0.005-1.0% | 0.01-1.0% | 0.01-0.5% | 0.05 to 0.2% |
| titanium oxide: | 0 to 0.5% | 0 to 0.2% | 0.001 to 0.05% | 0.01 to 0.02% |
| chromium oxide: | 0 to 10 ppm | 0 to 8 ppm | 0 to 5 ppm | 1 to 5 ppm |
| glass redox: | <=0.12 | <=0.10 | <=0.08 | <=0.05 |
| % FeO: | 0.0001-0.05% | 0.0001-0.01% | 0.001-0.008% | 0.001-0.003% |

It is noted that in other embodiments of this invention, additional layers (not shown) may be added to the coated articles discussed above, and/or certain layer(s) may be deleted.

EXAMPLE

For purposes of example, and without limitation, the following example coated article was made and tested according to an example embodiment of this invention. This Example is similar to the FIG. 5 embodiment.

The glass substrate 1 was cleaned/washed. It was then ion beam etched using argon gas to clean the surface thereof. Then, a silicon nitride barrier layer 3 (doped with Al) about 100 Å thick, a DLC (ta-C:H type) layer 5 about 70 Å thick, a zirconium nitride layer 7' about 100 Å thick, another DLC (ta-C:H type) layer 5' about 70 Å thick, another zirconium nitride layer 7 about 100 Å thick, and a sacrificial outer DLC (ta-C:H type) layer 9 about 70 Å thick were formed on a glass substrate (see FIG. 5). The ZrN layers 7 and 7' were formed via sputtering a Zr target in an atmosphere including N and Ar, and the DLC layers were formed via ion-beam deposition using an anode-cathode voltage of about 3,000 V and acetylene feedstock gas.

FIG. 3 is an XPS graph illustrating the pre-HT chemical make-up of the coated article according to this Example. As can be seen in FIG. 3, the carbon (C) spikes indicate the DLC layers 5 and 5', whereas the Zr spikes indicate the ZrN layers 7 and 7'. It is noted that the C content increases on the left edge of the FIG. 3 graph showing the thin DLC sacrificial layer 9 at the outermost layer of the pre-HT coating. The high oxygen content on the right side of the graph indicates the glass substrate, and the combination of the Si and N spikes in the same area indicates the optional silicon nitride barrier layer 3.

The coated article in the Example was then subjected to HT at about 625 degrees C. for about four minutes.

FIG. 4 is an XPS graph of the coated article of FIG. 3 (i.e., of this Example) after the HT. FIG. 4 illustrates that the overcoat DLC layer 9 burned off during HT due to combustion, and that pre-HT layers 5, 7', 5' and 7 merged or were transformed into a thick layer consisting essentially of scratch resistant zirconium oxide 11 that was slightly doped with nitrogen (see the right-hand coated article in FIG. 5 which is the post-HT article). It can be seen in FIG. 4 that residual carbon is left over in the zirconium oxide layer 11 due to the previous DLC layers which were present prior to heat treatment.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A thermally tempered coated article including a coating supported by a glass substrate, the coating comprising:
    an outermost layer comprising nanocrystalline zirconium oxide comprising cubic lattice structure, wherein the layer comprising nanocrystalline zirconium oxide is the outermost layer of the thermally tempered coated article.

2. The thermally tempered coated article of claim 1, further comprising a layer comprising DLC between the layer comprising zirconium oxide and the glass substrate.

3. The thermally tempered coated article of claim 1, wherein the layer comprising zirconium oxide further includes from 1-5% (atomic %) nitrogen.

4. The thermally tempered coated article of claim 1, wherein the coated article has a visible transmission of at least 75%.

5. The thermally tempered coated article of claim 1, wherein the coated article has a critical scratch load using an alumina sphere of at least about 20 lbs.

6. The thermally tempered coated article of claim 1 wherein the coated article has a critical scratch load using an alumina sphere of at least about 22.5 lbs.

7. The thermally tempered coated article of claim 1 wherein the coated article has a critical scratch load using an alumina sphere of at least about 30 lbs.

* * * * *